United States Patent [19]

Hoag

[11] 3,921,098

[45] Nov. 18, 1975

[54] PRESSURIZED LASER HOUSING
[75] Inventor: Ethan D. Hoag, Boston, Mass.
[73] Assignee: Avco Everett Research Laboratory, Inc., Everett, Mass.
[22] Filed: Sept. 27, 1974
[21] Appl. No.: 510,120

Related U.S. Application Data
[63] Continuation-in-part of Ser. No. 339,514, March 9, 1973, abandoned.

[52] U.S. Cl. ........ 331/94.5 G; 331/94.5 D; 330/4.3
[51] Int. Cl.² .......................................... H01S 3/22
[58] Field of Search .......... 331/94.5; 330/4.3; 60/44

[56] References Cited
UNITED STATES PATENTS
2,439,734    4/1948    Katalinsky ............................. 60/44

OTHER PUBLICATIONS
Harvey, Microwave Engineering, Academic Press, New York, 1963, pp. 73–76.

Primary Examiner—Robert J. Webster
Attorney, Agent, or Firm—Charles M. Hogan; Melvin E. Frederick; Eugene C. Goodale

[57] ABSTRACT

The working parts of a flowing gas laser are enclosed within a pressurized housing. An ionizer is mounted in proximity to the working region such that generated electrons pass into the working region wherein lasing action occurs.

7 Claims, 2 Drawing Figures

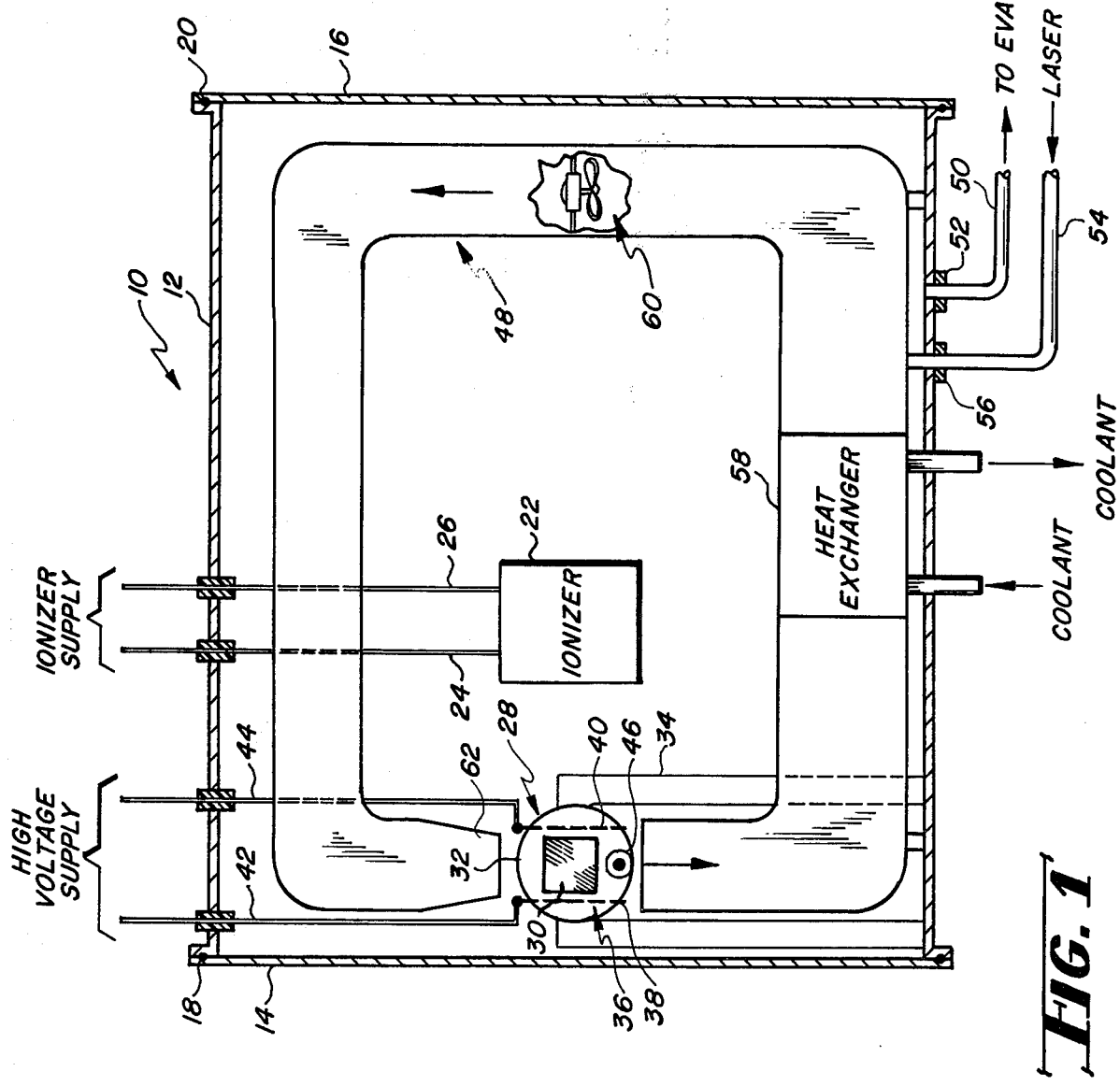

PRESSURIZED LASER HOUSING

This is a continuation-in-part, of application Ser. No. 339,514, filed Mar. 9, 1973, now abandoned.

BACKGROUND OF THE INVENTION

This invention relates generally to lasers and more particularly to a pressurized laser housing in which are secured the working parts of the laser.

Flowing gas lasers are known in the art. Examples of such lasers are disclosed in Wilson U.S. Pat. No. 3,543,179 and Daugherty et al., U.S. Pat. No. 3,702,973. The Daugherty patent provides an excellent discussion of background laser technology and the technology and terminology of the Wilson and Daugherty patents are incorporated herein by reference.

Prior art techniques involved the construction of the various working parts of the laser system to be structurally sound to withstand a high pressure differential. Each part or component was required to support the ambient condition while maintaining a reduced or increased pressure inside the flow area, as well as performing its function in the system. In the flowing gas laser, the medium or gas is continuously flowing through the flow path in a circulating fashion. Accordingly, the working parts had to act as a guide, as well as withstand the pressure differential between the flow area and the external atmosphere. The respective component parts had to be tightly sealed so that extraneous gas leaks would not develop so as to poison the system, i.e., if oxygen from the atmosphere would leak into the flow region, the system would be contaminated.

Accordingly, it is an object of this invention to provide a pressurized laser housing in which all of the working parts of the laser are mounted within one pressurized container so that these parts need not support heavy pressure loads.

Another object of this invention is to provide a pressurized laser housing for a flowing gas laser wherein the housing may be easily maintained at reduced pressures.

A still further object of this invention is to provide a pressurized laser housing wherein the housing is sealed from external atmosphere.

SUMMARY OF THE INVENTION

This invention provides a pressurized laser housing for a flowing gas laser. The housing is constructed of suitable material to withstand the required pressure differential between the system and atmosphere. The working components or parts of the laser flow system are mounted within the housing. An ionizer is mounted in proximity to the working region and is in communication with the laser gas flow path.

Other objects, details, uses and advantages of this invention will become apparent as the following description of the exemplary embodiments thereof presented in the accompanying drawings proceeds.

BRIEF DESCRIPTION OF THE DRAWINGS

FIG. 1 is a side elevational view of an exemplary embodiment of the pressurized laser housing of this invention with one side wall removed; and FIG. 2 is a fragmentary side elevational view of another exemplary embodiment of this invention particularly showing the ionizer exteriorly of the housing.

DESCRIPTION OF ILLUSTRATED EMBODIMENT

Reference is now made to FIG. 1 of the drawings which illustrates one exemplary embodiment of the improved pressurized laser housing of this invention which is designated generally by the reference numeral 10. The housing 10 is comprised of an outer housing 12 and front and rear doors 14 and 16, respectively, closing the ends of the housing 12 to define an enclosed chamber or container. Suitable seals 18 and 20 cooperate respectively between the doors 14 and 16 and the housing 12. Suitable means are provided for removing the respective doors from the housing 12. As an example, the doors may be supported and carried by a suitable gantry structure (not shown).

The housing 12 and doors 14 and 16 are constructed of suitable strength material to withstand the pressure differential of the laser system. Steel plate is an example of such suitable material since the housing 12 may, for example, be evacuated to 0.1 atmosphere during operation.

In the illustrative embodiment of FIG. 1, an ionizer or electron generator 22 is mounted within the chamber defined by the housing 12 and doors 14 and 16. The ionizer 22 may be a generator of the type disclosed in the aforementioned Daugherty patent so the operation thereof need not be repeated herein in detail. Leads 24 and 26 connect the ionizer 22 with an ionizer supply. Suitable gasket or seal fittings cooperate between the leads and the housing to insure a gas tight seal.

A resonant optical cavity, designated generally as 28, is defined by spaced mirror elements of which is shown one mirror 30 and mirror mount 32. The planes of the mirrors are normal to the direction of gas flow therethrough. One of the mirror elements is completely reflective and the other may be partially reflective and partially transmissive, or alternately divided into two parts comprising a feedback center portion to permit lasing action to occur surrounded by an outer annular portion for reflecting a portion of the beam out of the optical cavity. The spaced mirror elements are supported within the housing 12 by any suitable support structure or optic bench 34. The ionizer 22 is mounted by suitable support structure (not shown) to be in close proximity to the optical cavity 28.

A sustainer section, designated generally as 36, is carried within the resonant optical cavity 28, and is in communication with the ionizer 22. The electrodes 38 and 40 and supportive structure (not shown) of the sustainer section 36 are supported within the optical cavity 28. The electrodes 38 and 40 are connected by leads 42 and 44 to a high voltage supply. Suitable seals cooperate between the leads 42 and 44 and housing 12 to insure a gas tight seal. The detailed operation of an exemplary ionizer 22, sustainer section 36 and optical cavity 28 to produce a laser output are described in detail in the aforementioned Daugherty patent, as well as the U.S. Pat No. 3,721,915 issued Mar. 20, 1973, to James P. Reilly, and the disclosure of which is incorporated herein by reference as though set out at length herein. Suffice it to say herein that a laser gas, such as argon, xenon, crypton or mixtures of $CO_2$, $N_2$, He, is pumped through the optical cavity at a desired pressure and appropriate velocity. The gas is excited to a lasing state in the working region disposed and included within the resonant optical cavity means 28 by the electrical discharge provided by the cooperation between the ionizer 22 and the electrodes 38 and 40 of the sustainer section 36. The gas thus optically excited generates a laser mode in the region defined by opposed reflective mirrors of the optical cavity 28.

In the case of an amplifier device as distinguished from an oscillator device as described herein by way of example, an optical cavity is not, of course, necessary and an externally generated laser beam is introduced into the working region and amplified therein.

The reflective mirrors are positioned so as to direct the laser output to an aerodynamic laser window 46 suitably mounted in housing 12. An exemplary apparatus for positioning the laser mirrors is described in Jacob L. Zar U.S. Pat. No. 3,753,156 issued Aug. 14, 1973, entitled "Laser Mirror Positioning Apparatus," and assigned to the assignee of the present application and the disclosure of which is incorporated herein by reference as though set out at length herein. The aerodynamic window 46 is properly designed so as to maintain the pressure within the housing 12. Examples of such aerodynamic window and the operation of such are described in Hoag et al, U.S. Patent application Ser. No. 249,607, filed May 2, 1972, entitled "Aerodynamic Laser Window," now U.S. Pat. No. 3,851,273 and Jacob L. Zar U.S. Pat. No. 3,768,035 issued Oct. 23, 1973, entitled "Modular Aerodynamic Laser Window," and need not be described herein for an understanding of the present invention. The above Hoag et al and Zar patents are assigned to the assignee of the present application and the disclosure of which is incorporated herein by reference as though set out at length herein.

In a flowing gas laser of this type, extremely high power levels are required and thus a rapid flow of gas is needed to remove the waste heat from the optical cavity. This heat is then removed from the gas by means of a heat exchanger and the gas is recirculated through the optical cavity. This provides a closed cycle gas flow system and can be generally described as a wind tunnel, designated generally by the reference numeral 48 which is contained within the housing 12. The housing 12 is connected by a suitable conduit or pipe 50 to an evacuation pump (not shown) which evacuates or pressurizes the housing 12 when activated. The conduit 50 is secured to the housing 12 at one end of a suitable vacuum seal or fitting 52. The laser gas is supplied to the wind tunnel 48 from a laser gas supply (not shown) via a suitable conduit or pipe 54 which terminates at the one end in wind tunnel 48. A suitable gas seal or fitting 56 provides the required seal in the housing. In addition, suitable coolant and electrical fittings are provided in the housing 12.

The heated gas exits downwardly from the optical cavity 28 at a high velocity into heat exchanger 58 which reduces the temperature of the gas flowing therethrough to a desired operating temperature. Cooled gas from the heat exchanger 58 passes into the blower section 60. Any commerically obtainable blowers may be utilized which have the required operating characteristics. It may be desirable to provide a plurality of separate flow paths for optimum efficiency to obtain the desired velocity of the gas passing therethrough.

The outlet from blower section 60 is connected by suitable ducting to sustainer channel inlet 62.

Suitable gaskets are connected between each of the various sections of the wind tunnel 48. Suitable means such as clamps, nuts and bolts, or the like, are used to join each section one to the other. The wind tunnel ducting can be fabricated from any suitable material, such as sheet metal or the like. Since the entire interior of the housing 12 both inside and outside of wind tunnel 48 is maintained at a uniform pressure except for small dynamic pressure difference due to flow, the ducting need not support a large pressure differential thereby relieving much of the structural stress on the components.

During operation a portion of the gas in the wind tunnel becomes poisoned by the action of the sustainer discharge. This portion is allowed to escape into housing 12 through openings around the sustainer section and out through conduit 50 to the evacuation pump. At the same time an equal portion of fresh gas is continuously introduced through conduit 54 to the wind tunnel 48. Thus, the composition of the gas flowing through the laser system, i.e., the wind tunnel 48, is the same as the gas within the evacuated housing 12. The requirement for gas tight seals between the respective wind tunnel components is not needed since any gas leaking from wind tunnel 48 into the housing 12 is simply discharged by the evacuation pump.

Another exemplary embodiment of this invention is illustrated in FIG. 2. Only a fragmentary view is illustrated showing another embodiment of the pressurized housing illustrating a different placement of the ionizer. The main difference between the housing illustrated in FIG. 1 and FIG. 2 is in the placement of the ionizer. In the FIG. 2 embodiment, the ionizer 22A is suitably secured on the exterior side of the door 14A. An aperture 64 is formed in the door 14A so as to provide communication between ionizer 22A and the optical cavity 28A. The operation of the FIG. 2 embodiment is the same as hereinabove described with regard to the FIG. 1 embodiment.

The above described pressurized laser system is suitable for use in a hostile environment such as operation in the rugged industrial plant. The system is not affected by dust, heat or vibration. It is obvious that the material of the housing may be varied depending on the operating parameters of the laser beam desired.

The problems of prior flowing gas laser structures are eliminated since all of the working parts of the laser, i.e., the flow system, blowers, heat exchangers, and laser cavity optics, are enclosed within the pressurized housing. Accordingly, the aforementioned objectives have been accomplished.

It should be noted that the terminology used herein refers to similar terminology used in the referenced patents and applications. The definition of the laser components and structures described herein are considered to be consistent within the teaching of the specifically noted patents and applications.

While present exemplary embodiments of this invention have been illustrated and described, it will be recognized that this invention may be variously embodied and practiced by those skilled in the art.

What is claimed is:

1. In a flowing gas laser system, the combination comprising:
    an outer pressurized box-like housing capable of sealably withstanding heavy pressure differentials between the interior of said housing and the external atmosphere;
    first means defining a working region disposed within said housing, said first means including further means for permitting gaseous lasing medium disposed in said working region to leave same and enter that portion of the interior of said housing exterior of said ducting and working region;

closed cycle lightweight ducting mounted within said pressurized housing, each end of said ducting being in communication with said working region for directing a high velocity flow of a gaseous lasing medium through said working region;

ionizing means in communication with said working region for ionizing said gaseous lasing medium substantially throughout said working region;

electrode means disposed within said working region for impressing a voltage across said ionized gaseous lasing medium in said working region thereby exciting said gaseous lasing medium and creating a population inversion;

means carried by said housing for removing from said housing gaseous lasing medium exterior of said closed cycle ducting; and blower means mounted in said ducting for imparting movement to the lasing medium disposed in said ducting, the lasing medium filling said housing and ducting, the lasing medium in the working region during operation being at a slightly different pressure due to its velocity than the pressure of said lasing medium in said housing exterior of said ducting and working region.

2. The combination as set forth in claim 1 further comprising cooling means cooperating with said ducting for cooling the lasing medium disposed therein.

3. The combination as set forth in claim 2 in which said ducting includes a nozzle section communicating with said working region for providing the required velocity of lasing medium passing into the working region, and in which said ducting connects said nozzle section with said cooling means.

4. The combination as set forth in claim 1 wherein said first means further defines a resonant optical cavity included in said working region and;

further comprising second means carried by said housing and spaced from said first means for coupling out of said housing laser output energy generated in said resonant optical cavity.

5. In a flowing gas laser system, the combination comprising:

a housing having top, bottom, and side walls, and a pair of doors, said walls and doors defining a pressurizable enclosure;

first means mounted within said housing defining a working region;

second means defining a resonant optical cavity within said working region, said second means including opposed, parallel spaced apart mirrors;

closed cycle means mounted entirely within the defined enclosure for directing a rapid flow of gaseous lasing medium through the working region;

third means for permitting gaseous lasing medium disposed in said working region to leave same end enter that portion of the interior of said housing exterior of said closed cycle means and working region;

ionizing means mounted in proximity to the working region, said ionizing means being capable of transmitting electrons into said working region and through the gaseous lasing medium passing therethrough;

electrode means disposed within said working region for impressing a voltage across the ionized gaseous lasing medium in said working region thereby exciting said gaseous lasting medium and creating a population inversion;

means carried by said housing for removing from said housing gaseous lasing medium exterior of said closed cycle ducting; and blower means mounted in said ducting for imparting movement to the lasing medium disposed in said ducting, the lasing medium filling said housing and ducting, the lasing medium in the working region during operation being at a slightly different pressure due to its velocity than the pressure of said lasing medium in said housing exterior of said ducting and working region.

6. The combination as set forth in claim 5 in which said means for directing gaseous flow through the working region includes a closed cycle ducting communication at each end with said working region; and further comprising a heat exchanger connected with said ducting for maintaining the temperature of the gaseous lasing medium disposed in said ducting at an operating temperature.

7. The combination as set forth in claim 6 further comprising lasing medium supply means connected with said ducting to continuously supply gaseous lasing medium to the interior of said ducting.

* * * * *